(12) United States Patent
Mehta et al.

(10) Patent No.: US 7,059,760 B2
(45) Date of Patent: Jun. 13, 2006

(54) METHOD OF POST MIXING ADDITIVES TO HOT MELT ADHESIVES

(75) Inventors: Atul Mehta, New Berlin, WI (US); Michael Neperud, Hubertus, WI (US); Eric Roussel, Dardilly (FR)

(73) Assignee: Bostik, Inc., Wauwatosa, WI (US)

( * ) Notice: Subject to any disclaimer, the term of this patent is extended or adjusted under 35 U.S.C. 154(b) by 0 days.

(21) Appl. No.: 10/405,427

(22) Filed: Apr. 2, 2003

(65) Prior Publication Data

US 2004/0196734 A1    Oct. 7, 2004

(51) Int. Cl.
*B01F 3/08* (2006.01)
(52) U.S. Cl. .................... 366/138; 366/181.5
(58) Field of Classification Search ............ 366/76.1, 366/91, 138, 149, 181.4, 181.8, 182.2, 348, 366/181.5
See application file for complete search history.

(56) References Cited

U.S. PATENT DOCUMENTS

| | | | |
|---|---|---|---|
| 3,560,430 A | 2/1971 | Meyer et al. | |
| 3,754,735 A | 8/1973 | Hoyle et al. | |
| 4,059,714 A * | 11/1977 | Scholl et al. | ............ 428/317.5 |
| 4,220,416 A | 9/1980 | Brauner et al. | ............. 366/337 |
| 4,221,692 A | 9/1980 | Lambertini et al. | |
| 4,264,214 A * | 4/1981 | Scholl et al. | ............... 366/103 |
| 4,692,030 A | 9/1987 | Tauscher et al. | ............ 366/337 |
| 4,778,631 A * | 10/1988 | Cobbs et al. | ............... 261/128 |
| 4,923,903 A | 5/1990 | Alm et al. | |
| 4,938,381 A * | 7/1990 | Mandeville et al. | ........... 222/1 |
| 5,403,874 A | 4/1995 | Heuer et al. | ................. 523/344 |
| 5,480,589 A * | 1/1996 | Belser et al. | ................. 261/76 |
| 5,498,646 A | 3/1996 | Heuer et al. | ................. 523/344 |
| 5,565,522 A | 10/1996 | Bohringer et al. | |

(Continued)

FOREIGN PATENT DOCUMENTS

EP    0 368 270    5/1990

(Continued)

OTHER PUBLICATIONS

JP 8258041, Patent Abstracts of Japan, Atsumi Akihiro, Method and Apparatus for Mixing and Supplying Resin, vol. 1997, No. 02, Feb. 28, 1997.

(Continued)

*Primary Examiner*—David Sorkin
(74) *Attorney, Agent, or Firm*—Andrus, Sceales, Starke & Sawall, LLP

(57) ABSTRACT

A method and apparatus for post mixing an additive with a hot melt adhesives. The method includes the steps of providing a source of molten hot melt adhesive, feeding the hot melt adhesive to an inlet of a mixer, simultaneously feeding an additive for the hot melt adhesive to the inlet of the mixer, mixing the additive and molten hot melt adhesive in the mixer to form a homogeneous mixture, and recovering the homogenous mixture. The additive is preferably selected from wetness indicators, antimicrobial agents, pigments, dyes, ultraviolet light absorbers, antioxidants, fluorescent agents, pH indicators and fragrances. The method may be practiced either on a batch basis, or on a continuous basis. The apparatus includes a vessel containing molten hot melt adhesive, a mixer located downstream from the vessel, the mixer having an inlet and an outlet, a first pump located between the vessel and the mixer for pumping molten hot melt adhesive from the vessel to the inlet of the mixer, a source of an additive for the hot melt adhesive, and a second pump located between the source of the additive and the mixer for pumping the additive to the inlet of the mixer. The mixer may comprise either a static mixer or a dynamic mixer.

10 Claims, 4 Drawing Sheets

U.S. PATENT DOCUMENTS 5,865,537 A    2/1999   Streiff et al.
5,887,975 A    3/1999   Mordaunt et al.
6,150,017 A    11/2000  Burmeister et al.

FOREIGN PATENT DOCUMENTS

EP        0 958 855    11/1999

OTHER PUBLICATIONS

Brenda Jackson, "Static Mixers, What users should know about their specification and application for adhesives", Adhesives Age, Jan. 2002.

* cited by examiner

METHOD OF POST MIXING ADDITIVES TO HOT MELT ADHESIVES

BACKGROUND OF THE INVENTION

The present invention relates to the production of hot melt adhesives, and more particularly to the production of hot melt adhesives containing additives such as pigments.

A wide variety of hot melt adhesive compositions are known and used in the art. Typically, hot melt adhesive compositions will include one or more polymers, tackifying resins, plasticizers and waxes. Sometimes other optional additives such as pigments, dyes, ultraviolet light absorbers, antioxidants, fluorescent agents, pH indicators and fragrances may also be added depending upon the desired end use of the adhesive. In addition to the above constituents, hot melt adhesives may also be customized to include blends of polymers, copolymers, resins, and like ingredients that provide specific desired physical properties, as is well known in the art.

The traditional method of preparing hot melt adhesives is to add resin, waxes and plasticizing oils to a jacketed tank or vessel equipped with a standard rotating vertical agitator. This mixture is then heated to a temperature in the range of about 250° F. to about 350° F. The polymer in the form of a bead, pellet, pillow, or other particulate form is then added to the hot resin/oil mixture, and the temperature of the vessel is maintained between about 300° F. to about 350° F. with continuous agitation. The composition is complete when the polymer is homogeneously blended into the resin/oil mixture. The time required for complete blending is usually 3–8 hours depending upon the polymer constituent and the degree of agitation. The polymer typically disperses very slowly into the resin/oil mixture resulting in relatively long periods of time where the polymer and other ingredients are subjected to a relatively high temperature which can cause degradation of the polymer as well as other ingredients.

Another common and commercially practiced method of preparing hot melt adhesive compositions involves initially preparing a taffy-like melt of the polymer in a kneader with subsequent addition of resin, oil or other ingredients. In this method, the polymer is initially heated and kneaded or worked into a taffy-like melt. Small amounts of resin and oil may also be initially added to facilitate the working of polymer into the taffy-like melt. After about 0.5–2 hours, the final amounts of resin, oil and any other ingredients desired are added to the taffy-like melt.

In either of the above processes, the resultant liquid composition can be pumped from the processing equipment to a heated holding tank or the like. Thereafter, the adhesive composition is pumped into a container, such as a drum or the like, where it is allowed to cool and solidify for shipping. Alternately, the liquid composition may be pumped to pelletizing equipment to form pellets, pillows, ribbons, pastilles or other particulate configurations to be ultimately packaged in a bag for shipping. Hot melt adhesives are typically available commercially in various forms and packages, and a variety of different compositions, forms and packaging are available from many sources.

More detailed information on presently practiced methods for producing hot melt adhesives can be found in U.S. Pat. No. 5,498,646 and in the articles listed and referred to therein. Current technologies for manufacturing adhesives have several disadvantages, especially when formulating a composition that includes small amounts of additives such as pigments or dyes. Pigments and dyes are most often available in powder form. Since powdered additives do not melt or dissolve, they must be dispersed in the molten hot melt. It is difficult to thoroughly disperse powdered additives like pigments into high viscosity compositions such as hot melt adhesives because current technology typically utilizes mixing vessels with relatively low speed, low shear mechanical agitators, such as a rotating impeller immersed in the molten hot melt. Unless the additive is thoroughly blended therein, the resultant mixture has poor homogenation of the ingredients. If, for example, the additive is a pigment, poor homogenation results in inconsistent color of the resultant adhesive composition. Also, in order to obtain thorough mixing of an additive such as a pigment, the ingredients must be blended for relatively long times at high temperature which may cause degradation of the pigment itself. This in turn also results in inconsistent color. For these reasons, powdered additives are frequently dispersed first in another material such as mineral oil. This allows for more uniform dispersion in the molten hot melt.

Another disadvantage of the commercially practiced prior art methods, is that when it is desired to change the pigment, e.g. from blue to green or vice versa, or to a non-pigmented product, the entire system must be cleaned and flushed in order to prevent the next batch of adhesive from being tainted and off color. This results in relatively long down times and relatively high flush costs since the equipment must be completely purged of the prior pigment before charging the system with a new pigment or with a non-pigmented product.

Manufacturers of non-woven disposable articles such as disposable diapers, sanitary napkins, panty shields, surgical drapes, hospital pads, adult incontinence products and the like, are always desirous of reducing the costs of their product. One of the ways cost reduction can be achieved is by adding pigment to the hot melt adhesives which adhere the various substrates of the article together. One such substrate is typically composed of a thin layer of polyolefin material such as polyethylene or polypropylene film. Adding pigment to the hot melt adhesive allows the use of less expensive non-pigmented films since pigment in the adhesive permits reduced color concentration in the film which in turn results in the manufacturer being able to use a less expensive non-pigmented film. Also, the use of pigment in hot melt adhesives provides the manufacturer with the ability to combine the adhesive function with a visual enhancement function to improve the aesthetics of the manufactured article. Alternately, the pigmented hot melt can be used as a hot melt ink. Thus, improved methods of preparing adhesive compositions which avoid the disadvantages of conventional prior art methods is desirable.

SUMMARY OF THE INVENTION

The present invention provides a new and improved method of preparing hot melt adhesive compositions. The new method minimizes the cost of process equipment and minimizes heat degradation of the polymer and other additives in the composition. This is important especially with respect to pigments since the pigment added to the adhesive blend in the present method is not exposed to the relatively high temperatures initially used to blend the primary components of the adhesive composition in a vessel. The present method also provides excellent homogenation of all ingredients, especially low viscosity pigments with high viscosity adhesives, and minimizes flush costs and maintenance.

More particularly, a method of post mixing an additive with a hot melt adhesive is disclosed and described. The method includes the steps of providing a source of molten hot melt adhesive, feeding the hot melt adhesive to an inlet of a mixer, simultaneously feeding an additive for the hot melt adhesive to the inlet of the mixer, mixing the additive and molten hot melt adhesive in the mixer to form a homogeneous mixture, and recovering the homogenous mixture. In one preferred method, the mixer comprises a static mixer which results in the additional advantage of having no moveable parts so that static mixing requires minimal maintenance. In another preferred embodiment, the mixer comprises a dynamic shear mixture which utilizes high shear to mix the additive into the hot melt adhesive blend. The additive is preferably selected from wetness indicators, antimicrobial agents, pigments, dyes, ultraviolet light absorbers, antioxidants, fluorescent agents, pH indicators and fragrances. The method may be practiced either on a batch basis, or on a continuous basis. The present method is effective to blend both high viscosity materials as well as low viscosity materials, such as hot melt inks.

The present invention also provides an apparatus for post mixing an additive with a hot melt adhesive. The apparatus includes a vessel containing molten hot melt adhesive, a mixer located downstream from the vessel, the mixer having an inlet and an outlet, a first pump located between the vessel and the mixer for pumping molten hot melt adhesive from the vessel to the inlet of the mixer, a source of an additive for the hot melt adhesive, and a second pump located between the source of the additive and the mixer for pumping the additive to the inlet of the mixer. The mixer may comprise either a static mixer or a dynamic mixer.

Preferably, the additive is injected into the inlet of the mixer at a location as close to the first static mixing element as possible, and as close as possible to the center of the bulk stream flow. Also, the additive should be injected in the same direction as the bulk stream flow, and should be injected with a velocity that is approximately one to two times greater than the bulk stream velocity.

BRIEF DESCRIPTION OF THE DRAWINGS

The drawings illustrate the best mode contemplated of carrying out the invention.

In the drawings.

DETAILED DESCRIPTION OF THE INVENTION

Figure 1:
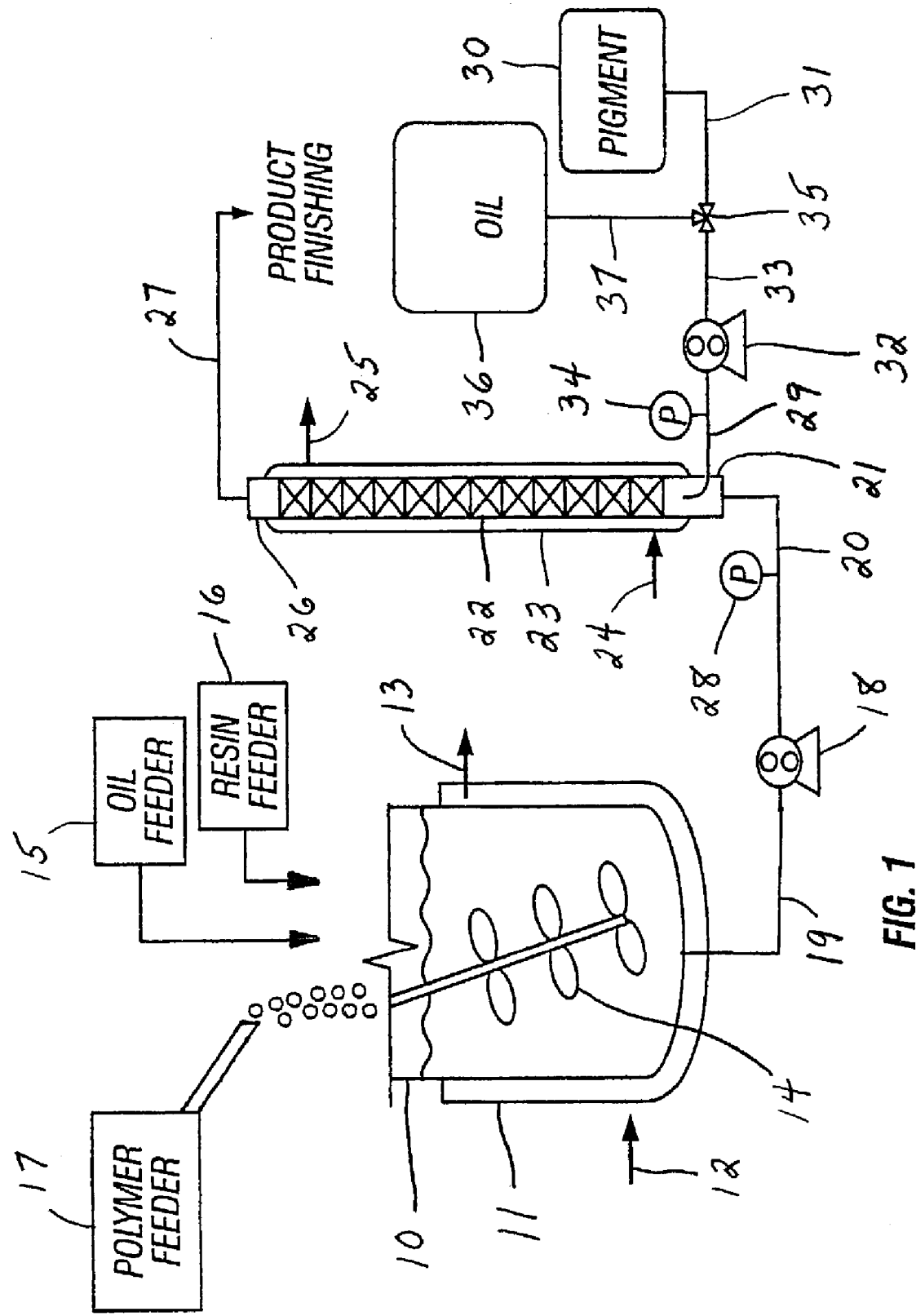
FIG. 1 is a schematic flow diagram illustrating the use of a static mixer in the process of the present invention.

Referring now to the drawings, FIG. 1 illustrates a method and apparatus for preparing a hot melt adhesive composition wherein an additive is blended into the adhesive composition after the adhesive composition is initially formulated. The process and apparatus illustrated provides excellent dispersion of the additive in the adhesive while at the same time avoiding heat degradation of the additive since the additive is not exposed to the high temperatures and extended mixing times of the initial adhesive blend. The method and apparatus also provides the advantage of flexibility in changing the additive, especially pigments, and minimal flush costs while at the same time providing an extremely consistent and homogeneous blend. The method may be practiced on a batch basis or on a continuous basis, as desired.

Referring now to FIG. 1, a first embodiment for practicing the method of producing hot melt adhesive compositions is illustrated which includes the use of a static mixer for post mixing additives into an initial blend of a hot melt adhesive composition. As illustrated, the arrangement includes a mixing vessel such as an open top tank 10 which is fitted with means for heating the contents thereof such as a steam jacket or hot oil jacket 11 having an inlet and an outlet for the hot steam or oil schematically illustrated by the arrows 12 and 13, respectively. Mixing of the contents within vessel 10 is accomplished by any appropriately sized agitation means such as a top entering turbine or paddle agitator 14, and vessel 10 may be baffled or unbaffled depending upon the agitation desired. A wide variety of known equipment may be used for vessel 10, jacket 11 and agitator 14, and it is only important that the equipment be capable of heating to temperatures of about 220° F. to about 400° F. and/or maintaining such temperatures to liquefy the adhesive ingredients, especially the polymer, and mixing the softened polymer, resin, wax and plasticizer/oil components together. The resin and oil may be preheated prior to charging vessel 10 to further reduce processing time, if desired.

In accordance with the method of the present invention, the individual ingredients of the hot melt adhesive composition are metered into vessel 10 in desired amounts, as will hereinafter be described to provide an initial charge comprised of polymer, resin, wax and plasticizer/oil. The oil and resin are stored in liquid form in feed tanks 15 and 16 respectively. The oil and resin are added using positive displacement meter pumps (not shown) as are known in the art. Resin could also be added in flake form, if desired. Other individual ingredients may likewise be fed to vessel 10, as desired, to formulate an initial mix or charge in vessel 10. The polymer in the form of a bead, pellet, pillow, ribbon, pastille or other particulate form is added using a solid weight loss feeder 17 of a type also known in the art. This initial charge or melt is stirred or mixed while simultaneously being held at temperatures of about 220° F. to 350° F. so that all the ingredients soften and blend together. This initial melt or charge is stirred at such temperatures for a sufficient amount of time to provide a homogeneous mixture or blend of ingredients to form a hot melt adhesive composition.

An appropriate gear pump 18 is connected to the bottom of vessel 10 via line 19 to receive the liquid melt contents thereof and pump them via line 20 to the inlet 21 of a static mixer 22. Static mixer 22 is fitted with means for heating the contents thereof such as a steam jacket or hot oil jacket 23 and includes a steam or oil inlet and outlet illustrated by arrows 24 and 25, respectively. Mixer 22 also includes an outlet 26 through which finished product exits and flows via line 27 to a holding tank (not shown) and is thereafter packaged as desired. A pressure gauge 28 is connected to line 20 to monitor pressure of the adhesive composition being pumped into static mixer 22. Static mixer 22 is an apparatus well known in the art. The principle of the static mixer involves pumping raw materials through a pipe which contains numerous inline elements or components which separate, move and gather fluid flow. Fluid flow through a static mixer is laminar rather than turbulent. The elements contained within mixer 22 can take on various configurations, and more-detailed information on the principles and components of static mixer 22 are described in U.S. Pat. Nos. 4,692,030 and 4,220,416 as well as in Jackson, "Static Mixers", Adhesives Age, January 2002.

Numerous different makes and models of static mixers are commercially available on the market. A presently preferred static mixer is the model SMX from Koch-Glitsch, Inc. of Wichita, Kan. A typical SMX static mixer has the following characteristics:

| | |
|---|---|
| Mixer type | SMX |
| Number of elements | Twelve, removable, supplied in pairs |
| Material of Construction | 316L SS |
| Core Pipe | 1" sch 40 pipe |
| End Connections | NPT Threaded end connections |
| Jacket | 1½" sch 10 pipe with two ⅜" threaded end connections for service fluid |
| Housing Material of construction | 316/316L SS Complete |
| Design Pressure/Temperature | 195 psig at 400 F |
| Overall length | 21" end to end |

Static mixer 22 is preferably disposed in a vertical orientation to assure that it is filled with product during operation. Otherwise, air will become trapped in static mixer 22 and decrease the efficiency of mixing. Also, product should be fed from the bottom or inlet 21 to keep static mixer full of product during operation. It should further be noted that although the preferred static mixer 22 contains twelve removable elements therein, any number of elements may be utilized depending upon the adhesive composition and the additive being mixed therein. The only limiting feature is that sufficient number of elements are utilized to provide a homogeneous mixture exiting via line 27. Static mixer 22 not only receives the hot melt adhesive composition in line 20 via inlet 21, but also simultaneously receives an additive fed thereto via line 29 in order to homogeneously mix the additive with the hot melt adhesive. The additive typically comprises less than 10% by weight of the adhesive composition and is preferably selected from wetness indicators, antimicrobial agents, pigments, dyes, ultraviolet light absorbers, antioxidants, fluorescent agents, pH indicators and fragrances. The preferred additive for use with the present method and apparatus is a low viscosity pigment such as carbon black dispersion and/or titanium dioxide dispersion. Two examples of the types of pigment dispersions that are useful in the present invention include the following. A black pigment dispersion consisting of 22 percent carbon black in di-isodecyl phthalate plasticizer can be commercially obtained from Noveon, Inc. in Cleveland, Ohio under the tradename Auracote 10-5C-97-A718. This pigment dispersion can be used at a level of about 1.0 percent by weight to produce a black opaque hot melt adhesive. A second pigment dispersion consisting of 65 percent titanium dioxide in Kaydol mineral oil can be obtained from Noveon, Inc. in Cleveland, Ohio under the designation BS 17157. This pigment dispersion can be incorporated into a hot melt adhesive at about a two percent level to render it white and opaque in color. Various other dispersions can be obtained that will provide different color hot melt adhesives.

As illustrated, the additive is typically supplied via a holding tank or container 30. An appropriate gear pump 32 is connected to container 30 via lines 31 and 33 to receive the additive and pump the additive through line 29 where it is injected into inlet 21 of static mixer 22. A pressure gauge 34 monitors the pressure in line 29. A three-way valve 35 is connected at one side to line 31, at its opposite side to line 33 which leads to the inlet of pump 32, and at its third side to a source of pressurized oil 36 via line 37. As a result, three-way valve 35 enables ready flushing of the system by blocking the feeding of additive in line 33 and opening line 37 to pressurized oil 36 to thereby prevent flow of the additive into static mixer 22 and instead feed pressurized oil to the inlet of pump 32 via line 33 until sufficient amount of adhesive and oil is pumped into and passed through static mixer 22 to purge static mixer 22 of the additive previously being fed thereto. Pressurized oil is the preferred flushing agent since the oil, such as mineral oil, is compatible with the hot melt adhesive and thus would not require any further purging of the system. However, any flushing agent compatible with the hot melt adhesive could be utilized, if desired so long as the flushing agent is fed or passed through the static mixer 22 for a sufficient amount of time to substantially completely purge the mixer 22 of the prior additive.

Figure 2:
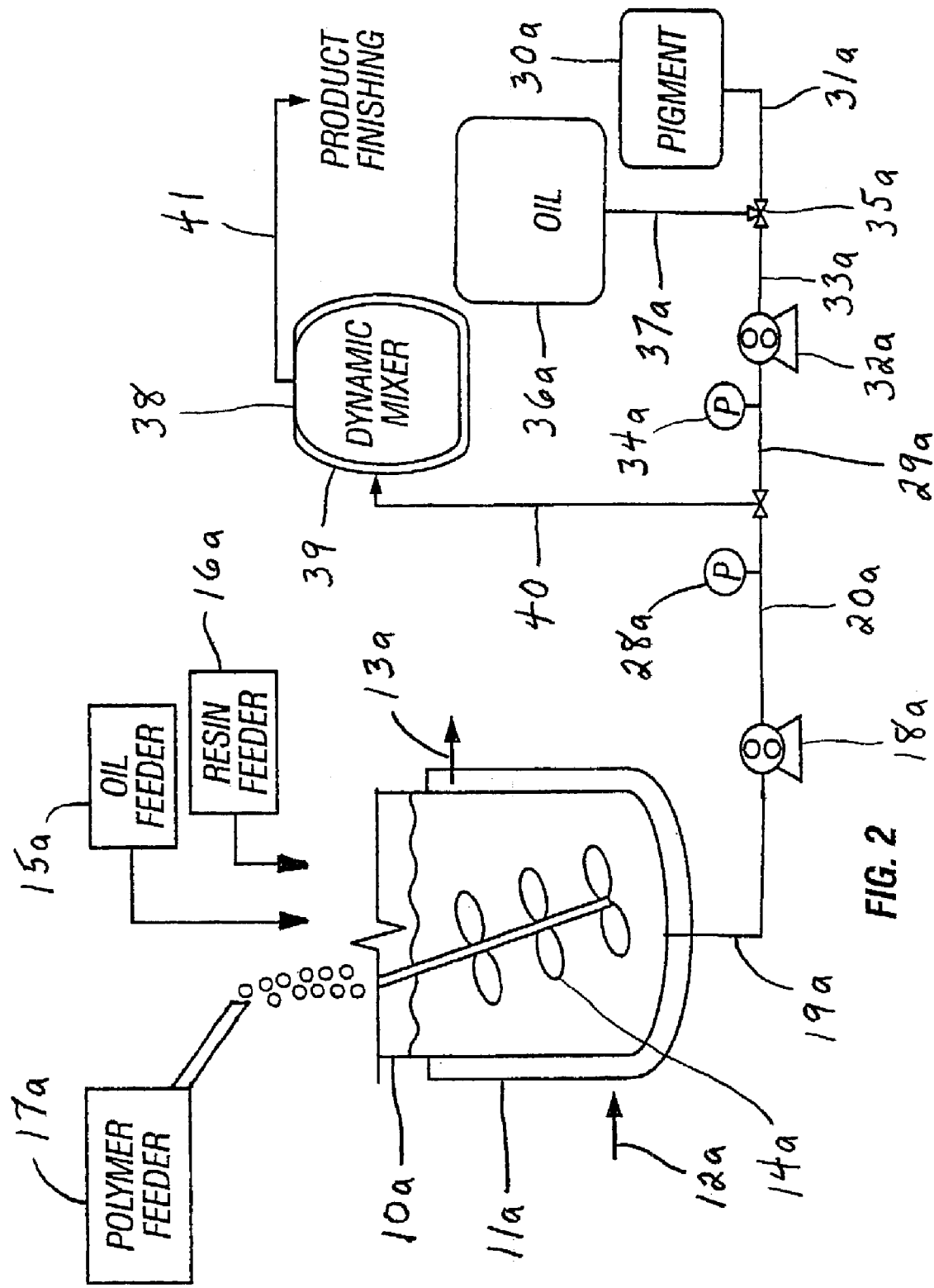
FIG. 2 is a schematic flow diagram illustrating a second embodiment utilizing a dynamic mixer in the process of the present invention.

Referring now to FIG. 2, there is illustrated a second preferred embodiment of the present method and apparatus. The embodiment of FIG. 2 is similar to the embodiment illustrated in FIG. 1, and accordingly like elements are numbered utilizing the subscript "a" since these element correspond with the elements described with respect to FIG. 1. In the embodiment illustrated in FIG. 2, instead of feeding the hot melt adhesive composition and additive to the static mixer 22, the hot melt adhesive composition and additive are both fed to a dynamic shear mixer 38. Like static mixer 22, dynamic mixer 38 is fitted with means for heating the contents thereof such as a steam jacket or hot oil jacket 39. The temperature of the hot melt adhesive and additive are maintained at the desired temperature of about 220° F. to about 350° F. while mixing. As illustrated, the hot melt adhesive composition and additive are fed via line 40 into mixer 38 where they are homogeneously mixed and exit via line 41 to be further processed downstream and thereafter packaged as desired. Dynamic mixer 38 is well known in the art and various makes and models are commercially available. One particularly preferred mixer 38 is available from Silverson Machines, Inc. of East Longmeadow, Massachusetts under the tradename "High Shear In-Line Mixer".

Figure 4:
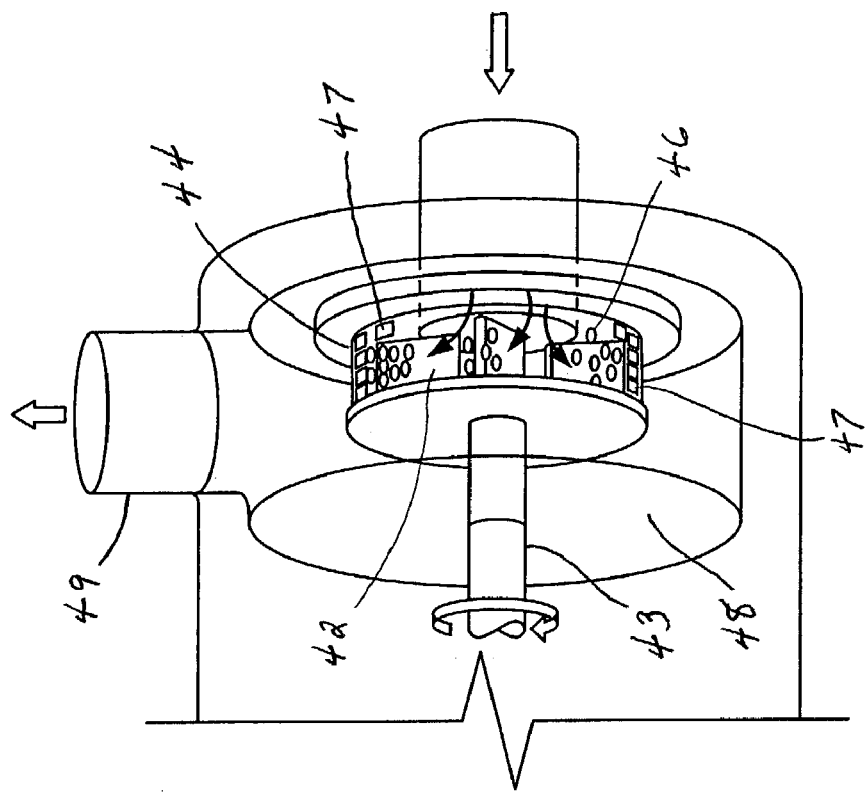
FIG. 4 is a schematic diagram illustrating stage 2 of the dynamic mixer wherein centrifugal force drives the liquid adhesive and additive radially outwardly towards the periphery of the rotor/stator assembly.
Figure 3:
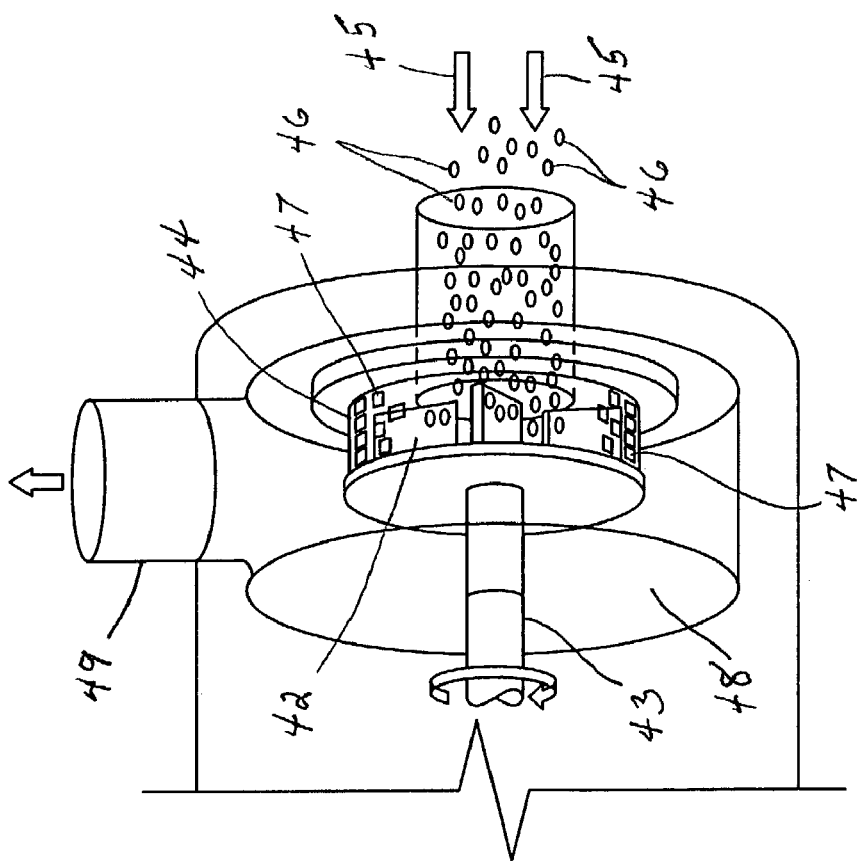
FIG. 3 is a schematic diagram illustrating stage 1 of a dynamic mixer wherein the rotor blades draw liquid adhesive containing an additive into the rotor/stator assembly.
Figure 5:
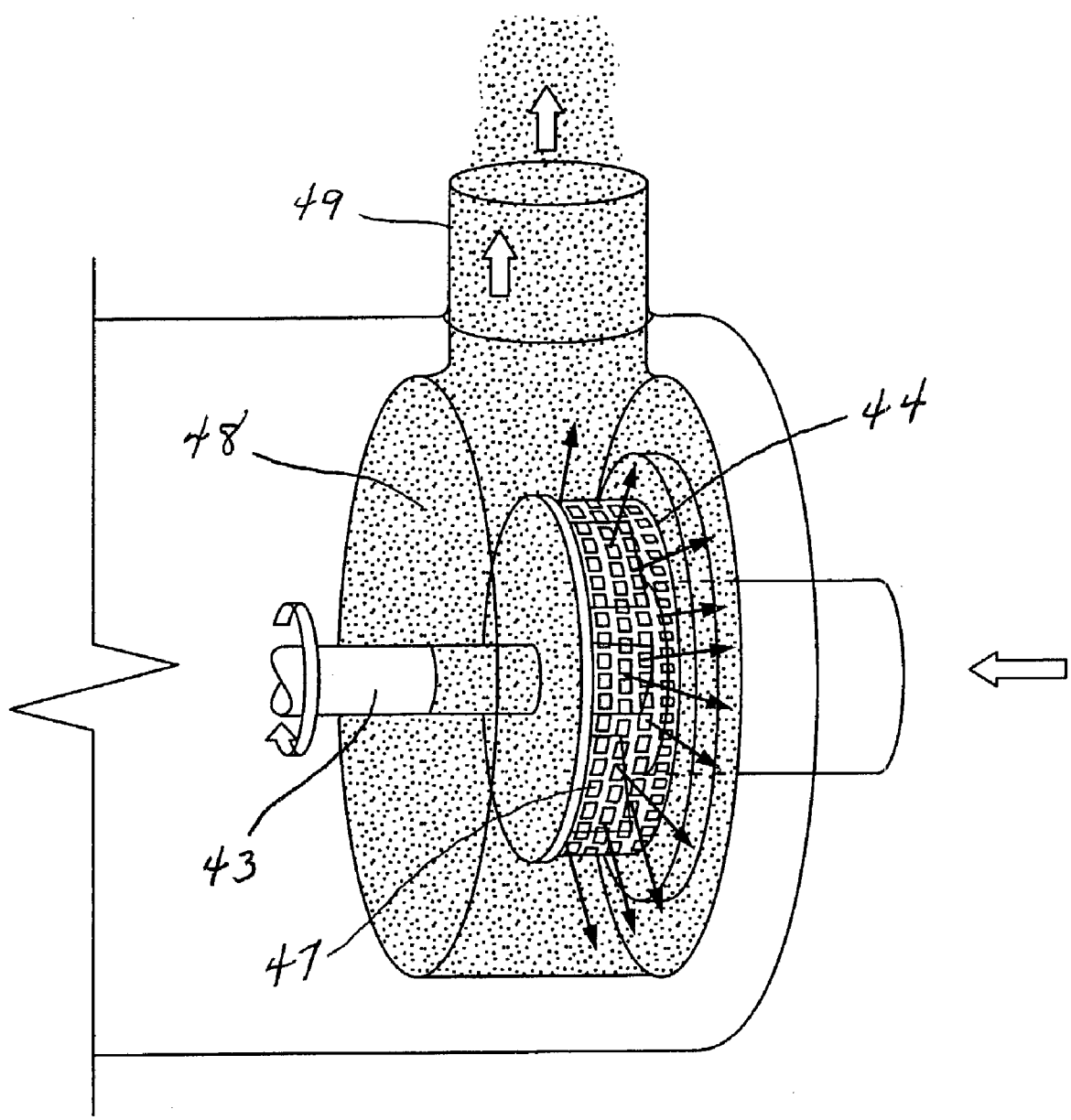
FIG. 5 is a schematic diagram illustrating stage 3 of the dynamic mixer wherein the liquid adhesive and additive are subjected to high shear by being forced at high velocity out through the perforations in the stator.

FIGS. 3–5 illustrate the operation of dynamic mixer 38. FIG. 3 illustrates stage 1 wherein the high speed rotation of rotor blades 42 via shaft 43 within mixing work head 44 exerts a powerful suction, drawing liquid adhesive composition schematically illustrated by arrows 45 and an additive schematically illustrated by particles 46 into the rotor/stator assembly. FIG. 4 illustrates stage two of the dynamic mixer wherein centrifuigal force drives the liquid hot melt adhesive composition and additive towards the periphery of work head 44 which are subjected to a milling action by the precision machined clearance between the ends of rotor blades 42 and the inner wall of the stator or work head 44. Finally, FIG. 5 illustrates stage three of dynamic mixer 38 and illustrates that the liquid hot melt adhesive and additive are hydraulically sheared as they are forced at high velocity through perforations 47 in the stator or work head 44. The liquid hot melt adhesive, now thoroughly and homogeneously mixed with the additive, then enters chamber 48 and exits mixer 38 via outlet 49 and into line 41. At the same time, fresh hot melt adhesive and additive are continually drawn into the work head 44 thus maintaining the mixing and pumping cycle.

Hot Melt Adhesive

The method and apparatus of the present invention is adaptable to the production of virtually any type of hot melt adhesive composition. It is especially adapted to the production of thermoplastic or thermosetting pressure sensitive adhesives. As is well known, hot melt adhesives comprise a blend of various compatible ingredients and typically includes a blend of a polymer and/or copolymer, tackifying resin, plasticizer, wax and an antioxidant. Examples of typical formulations can be found in U.S. Pat. No. 5,149,741 and U.S. Reissue Pat. No. 36,177 the disclosures of which are both incorporated herein by reference.

Any of a variety of well known and readily available thermosetting materials can be used as the polymer, copolymer or in blends of polymers and/or copolymers in the adhesive compositions. Examples of such materials include polyacrylates, polyesters, polyurethanes, polyepoxides, aldehyde containing resins such as phenol-aldehyde, urea-aldehyde, melamine-aldehyde and the like, as well as polyimides.

Any of a variety of well known and readily available thermoplastic materials can also be used as the polymer, copolymer or in blends of polymers and/or copolymers in the adhesive compositions. Examples of such materials include ethylene based polymers, including ethylene vinyl acetate, ethylene acrylate, ethylene methacrylate, ethylene methyl acrylate, ethylene methyl methacrylate, an ethylene-styrene interpolymer (ESI), an ethylene acrylic acid, ethylene vinyl acetate carbon monoxide, and ethylene N-butyl acrylate carbon monoxide; polybutene-1 polymers; polyolefins such as high and low density polyethylene; polyethylene blends and chemically modified polyethylene, copolymers of ethylene and $C_1$–$C_6$ mono- or di-unsaturated monomers; polyamides; polybutadiene rubber; polyesters such as polyethylene terephthalate, and polybutylene terephthalate; thermoplastic polycarbonates; atactic polyalphaolefins, including atactic polypropylene, polyvinylmethylether and others; thermoplastic polyacrylamides, such as polyacrylonitrile, and copolymers of acrylonitrile and other monomers such as butadiene styrene; polymethyl pentene; polyphenylene sulfide; aromatic polyurethanes; polyvinyl alcohols and copolymers thereof; polyvinyl acetate and random copolymers thereof; styrene-acrylonitrile, acrylonitrile-butadiene-styrene, styrene-butadiene rubbers, acrylonitrile-butadiene-styrene elastomers, A-B, A-B-A, A-$(B-A)_n$-B, $(A-B)_n$-Y block copolymers wherein the A block comprises a polyvinyl aromatic block such as polystyrene, the B block comprises a rubbery midblock which can be polyisoprene or polybutadiene, and optionally hydrogenated polyisoprene or hydrogenated polybutadiene, Y comprises a multivalent compound, and n is an integer of at least 3, and mixtures of said substances. Examples of these latter block copolymers including styrene-butadiene, styrene-butadiene-styrene, styrene-isoprene-styrene, styrene-ethylene-butylene-styrene and styrene-ethylene propylene-styrene.

While the total styrene content of the polymers can be as much as 51 wt-% of the polymer, and since the polymers can have more than two A blocks for optimal performance, the total A block should be less than or equal to about 45 wt-% of the polymers, and, most preferably, is less than or equal to 35 wt-% of the polymer. In an S-B-S (styrene-butadiene-styrene) copolymer, the preferred molecular weight is about 50,000 to 120,000, and the preferred styrene content is about 20 to 45 wt-%. In an S-I-S (styrene-isoprene-styrene) copolymer, the preferred molecular weight is about 100,000 to 200,000 and the preferred styrene content is about 14–35 wt-%.

Hydrogenating the butadiene midblocks produces rubbery midblocks that are typically converted to ethylene-butylene midblocks.

Such block copolymers are available from Kraton Polymers, Enichem, Fina and Dexco. Multiblock or tapered block copolymers (the A-$(B-A)_n$-B type) are available from Firestone.

Other polymers that could be used are syndiotactic polypropylene (SPP) polymers or isotactic polypropylene random copolymers (RCP) and/or blends of SPP or RCP with amorphous atactic poly-α-olefins (APAO), all of which are well known in this art. The SPP polymers are essentially high molecular weight stereospecific propylene homopolymers or copolymers of propylene with other a-olefin monomers such as ethylene, butene-1 or hexene-1. RCPs comprise a random copolymer of propylene and an a-olefin having the formula R—CH=$CH_2$ where R is hydrogen or a $C_2$ to $C_{10}$ alkyl group, preferably ethylene. The useful RCP polymers for the present invention are preferably metallocene catalyzed (mRCP) and will contain at least 1.5% by weight of the said x-olefin comonomer, and having a melting point of 145° C. or lower, as measured by DSC method, a melt flow rate of 1 to 500 g/10 min. per ASTM Method D-1238, and a solid density of 0.880 to 0.905 g/cc per ASTM Method D-1505. APAO polymers are a family of essentially amorphous low molecular weight homopolymers of propylene or copolymers of propylene with ethylene or butene or hexene.

The tackifying resins which are used in the adhesives of the present invention are those which extend the adhesive properties and improve the specific adhesion of the polymer. As used herein, the term "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall oil rosin and the phenolic modified pentaerythritol ester of rosin;

(c) polyterpene resins having a softening point, as determined by ASTM method E28–58T, of from about 60° C. to 140° C., the latter polyterpene resins generally resulting from the polymerization of terpene hydrocarbons, such as the monoterpene known as pinene, in the presence of Friedel-Crafts catalysts at moderately low temperatures; also included are the hydrogenated polyterpene resins;

(d) copolymers and terpolymers of natural terpenes, e.g. styrene/terpene, α-methyl styrene/terpene and vinyl toluene/terpene;

(e) phenolic-modified terpene resins such as, for example, the resin product resulting from the condensation, in an acidic medium, of a terpene and a phenol;

(f) aliphatic petroleum hydrocarbon resins having Ring and Ball softening points of from about 60° to 140° C., the latter resins resulting from the polymerization of monomers consisting primarily of olefins and diolefins; also included are the hydrogenated aliphatic petroleum hydrocarbon resins; examples of such commercially available resins based on a C$_5$-olefin fraction of this type are "Wingtack 95" and "Wingtack 115" tackifying resins sold by Goodyear Tire and Rubber Company;

(g) aromatic petroleum hydrocarbons and the hydrogenated derivatives thereof;

(h) aliphatic/aromatic petroleum derived hydrocarbons and the hydrogenated derivatives thereof.

Mixtures of two or more of the above described tackifying resins may be required for some formulations. An example of a commercially available tackifying resin which is useful for the present invention includes the resin which is identified commercially by the trade designation Escorez 5600. This resin is a partially hydrogenated aliphatic aromatic hydrocarbon resin, and is available from Exxon Chemical Company.

A plasticizer can also be present in the adhesive composition in order to provide desired viscosity control without substantially decreasing the adhesive strength or the service temperature of the adhesive. A suitable plasticizer may be selected from the group which not only includes the usual plasticizing oils, such as mineral oil, but also olefin oligomers and low molecular weight polymers, glycol benzoates, as well as vegetable and animal oil and derivatives of such oils. The petroleum derived oils which may be employed are relatively high boiling temperature materials containing only a minor proportion of aromatic hydrocarbons. In this regard, the aromatic hydrocarbons should preferably be less than 30%, and more particularly less than 15%, by weight, of the oil. Alternately, the oil may be totally non-aromatic. The oligomers may be polypropylenes, polybutenes, hydrogenated polyisoprene, hydrogenated butadiene, or the like having average molecular weights between about 350 and about 10,000. Suitable vegetable and animals oils include glycerol esters of the usual fatty acids and polymerization products thereof. Other plasticizers may be used provided they have suitable compatibility. Kaydol, a USP grade paraffinic mineral oil manufactured by Crompton Corporation, has also been found to be an appropriate plasticizer. As will be appreciated, plasticizers have typically been employed to lower the viscosity of the overall adhesive composition without substantially decreasing the adhesive strength and/or the service temperature of the adhesive. The choice of plasticizer can be useful in formulation for specific end uses (such as wet strength core applications).

Waxes can also be used in the adhesive composition, and are used to reduce the melt viscosity of the hot melt construction adhesives without appreciably decreasing their adhesive bonding characteristics. These waxes also are used to reduce the open time of the composition without effecting the temperature performance. Among the useful waxes are:

(1) low molecular weight, that is, 1000–6000, polyethylene having a hardness value, as determined by ASTM method D-1321, of from about 0.1 to 120 and ASTM softening points of from about 150° to 250° F.:

(2) petroleum waxes such as paraffin wax having a melting point of from about 130° to 170° F. and microcrystalline wax having a melting point of from about 135° to 200° F., the latter melting points being determined by ASTM method D127-60;

(3) atactic polypropylene having a Ring and Ball softening point of from about 120° to 160° C.;

(4) synthetic waxes made by polymerizing carbon monoxide and hydrogen such as Fischer-Tropsch wax; and (5) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred to use in the compositions of the present invention have a Ring and Ball softening point of 200° F. to 350° F. As should be understood, each of these wax diluents is solid at room temperature. Other useful substances include hydrogenated animal, fish and vegetable fats and oils such as hydrogenated tallow, lard, soya oil, cottonseed oil, castor oil, menhadin oil, cod liver oil, etc., and which are solid at ambient temperature by virtue of their being hydrogenated, have also been found to be useful with respect to functioning as a wax diluent equivalent. These hydrogenated materials are often referred to in the adhesives industry as "animal or vegetable waxes."

The adhesive also typically includes a stabilizer or antioxidant. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by deterioration in the appearance, physical properties and performance characteristics of the adhesive. A particularly preferred antioxidant is Irganox 1010, a tetrakis(methylene (3,5-di-teri-butyl-4-hydroxyhydrocinnamate))methane manufactured by Ciba-Geigy. Among the applicable stabilizers are high molecular weight hindered phenols and multifunctional phenols, such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxy-benzyl) benzene;

pentaerythritol tetrakis-3(3,5-di-tert-butyl-4-hydroxyphenyl) propionate;

n-octadecyl-3(3,5-ditert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6-(4-hydroxyphenoxy)-2,4-bis(n-ocytlthio)-1,3,5-triazine;

2,4,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

EXAMPLE 1

1) White EVA Based Hot Melts Made Using a Static Mixer.

An EVA based hot melt adhesive was produced in a turbine kettle using typical process conditions. The composition was comprised of 39% of aromatic modified aliphatic hydrocarbon resin, 59% of ethylene/vinyl acetate copolymer and 0.5% of antioxidant. The product was mixed at 325° F. Once the batch was done, the pigment and adhesive gear pumps were calibrated to obtain consistent flow that would give 1.5% pigment level. The static mixer (SMX diameter 1.5 inches and length 18 inches containing 12 elements) was kept at 325° F. Adhesive was allowed to flow through a gear pump to the static mixer. When adhesive was coming out of the static mixer, the pigment gear pump was started. The pigment was added in the form of a dispersion in mineral oil. A couple of pounds were necessary to obtain a homogenous color. Before the end of the batch, the pigment pump was shut down and oil was introduced in the pigment addition tube to purge the pigment from it. During this time the adhesive was still running in such a manner to flush the static mixer. Approximately 30 pounds were required. More specific information is available in the following Table 1.

The pigmented hot melt was made at two different production rates (approximately 280 and 480 pounds per hour). No significant different was seen between the two runs.

TABLE 1

| Product | RUN #1 White EVA | RUN #2 White EVA |
| --- | --- | --- |
| Glue density @ process temperature | 0.889 | 0.889 |
| Process temperature (F) | 312 | 315 |
| Pigment density @ room temperature | 1.84 | 1.84 |
| Number of elements | 12 | 12 |
| Glue viscosity @ process temperature (cP) | 7992 | 7579 |
| Glue pump speed (rpm) | 47.1 | 79.7 |
| Glue flow rate (lbs/hrs) | 277.2 | 469.0 |
| Pigment pump speed (rpm) | 6 | 10 |
| Pigment flow rate (lbs/hrs) | 4.26 | 7.10 |
| Total flow rate (lbs/hrs) | 281.4 | 476.1 |
| % of pigment | 1.5% | 1.5% |
| Pigment pressure (psi) | 45 | 70 |
| Glue pressure (psi) | 60 | 75 |
| Velocity (m/s) | 0.0781 | 0.1322 |
| Estimated drop pressure (psi) | 48.8 | 78.2 |

EXAMPLE 2

2) Blue SBS Block Copolymer Based Hot Melt Made Using a Static Mixer.

An SBS based hot melt adhesive was produced in a turbine kettle using typical process conditions. The composition was comprised of 19.3% of white mineral oil, 59.2% of styrenated polyterpene hydrocarbon resin, 19.7% of styrene/butadiene/styrene multi-block copolymer and 0.7% of antioxidant. The product was mixed at 325° F. and then reduced to 260° F. Once the batch was done, the pigment and adhesive gear pump were calibrated to obtain consistent flow that would give 1.1% pigment level. The static mixer (SMX diameter 1.5 inches and length 18 inches containing 12 elements) was kept at 260° F. Adhesive was allowed to flow through a gear pump to the static mixer. When adhesive was coming out of the static mixer, the pigment gear pump was started. The pigment was added in the form of a dispersion in mineral oil. A couple of pounds were necessary to obtain a homogenous color. Before the end of the batch, the pigment pump was shut down and oil was introduced in the pigment addition tube to purge the pigment from it. During this time the adhesive was still running in such a manner to flush the static mixer. Approximately 30 pounds were required. More specific information is available in the following Table 2.

TABLE 2

| Product | Blue SBS |
| --- | --- |
| Glue density @ process temperature | 0.906 |
| Process Temperature (F) | 260 |
| Pigment density @ room temperature | 1.47 |
| Number of elements | 12 |
| Glue viscosity @ process temperature (cP) | 9564 |
| Glue pump speed (rpm) | 74.2 |
| Glue flow rate (lbs/hrs) | 445.1 |
| Pigment pump speed (rpm) | 8.7 |
| Pigment flow rate (lbs/hrs) | 4.95 |
| Total flow rate (lbs/hrs) | 450.1 |
| % of pigment | 1.10% |
| Pigment pressure (psi) | 100 |
| Glue pressure (psi) | 103 |
| Velocity (m/s) | 0.1230 |
| Estimated drop pressure (psi) | 91.9 |

EXAMPLE 3

3) Green SBS Block Copolymer Based Hot Melts Made Using a Static Mixer.

An SBS based hot melt adhesive was produced in a turbine kettle using typical process conditions. The composition was comprised of 15.2% of white mineral oil, 58% of styrenated polyterpene hydrocarbon resin, 19.7% of styrene/butadiene/styrene multi-block copolymer and 0.7% of antioxidant. The product was mixed at 325° F. and then reduced to 265° F. Once the batch was done, the pigment and adhesive gear pump were calibrated to obtain consistent flow that would give 6.4% pigment level. The static mixer (SMX diameter 1.5 inches and length 18 inches containing 12 elements) was kept at 265° F. Adhesive was allowed to flow through a gear pump to the static mixer. When adhesive was coming out of the static mixer, the pigment gear pump was started. The pigment was added in the form of a dispersion in mineral oil. A couple of pounds were necessary to obtain a homogenous color. Before the end of the batch, the pigment pump was shut down and oil was introduced in the pigment addition tube to purge the pigment from it. During this time the adhesive was still running in such a manner to flush the static mixer. Approximately 30 pounds were required. More specific information is available in the following Table 3.

TABLE 3

| Product | Green SBS |
| --- | --- |
| Glue density @ process temperature | 0.9 |
| Process Temperature (F) | 265 |
| Pigment density @ room temperature | 1.01 |
| Number of elements | 12 |
| Glue viscosity @ process temperature (cP) | 9120 |
| Glue pump speed (rpm) | 71.6 |
| Glue flow rate (lbs/hrs) | 421.2 |
| Pigment pump speed (rpm) | 73.6 |
| Pigment flow rate (lbs/hrs) | 28.80 |
| Total flow rate (lbs/hrs) | 450.0 |
| % of pigment | 6.40% |
| Pigment pressure (psi) | 100 |
| Glue pressure (psi) | 103 |

TABLE 3-continued

| Product | Green SBS |
| --- | --- |
| Velocity (m/s) | 0.1235 |
| Estimated drop pressure (psi) | 88.0 |

EXAMPLE 4

4) Light Green SBS Block Copolymer Based on Hot Melt Made Using a Static Mixer.

An SBS based hot melt adhesive was produced in a turbine kettle using typical process conditions. The composition was comprised of 17% of white mineral oil, 59.2% of styrenated polyterpene hydrocarbon resin, 19.8% of styrene/butadiene/styrene multi-block copolymer and 0.7% of antioxidant. The product was mixed at 325° F. Once the batch was done, the pigment and adhesive gear pump were calibrated to obtain consistent flow that would give 3.3% pigment level. The static mixer (SMX diameter 1.5 inches and length 18 inches containing 12 elements) was kept at 325° F. Adhesive was allowed to flow through a gear pump to the static mixer. When adhesive was coming out of the static mixer, the pigment gear pump was started. The pigment was added in the form of a dispersion in mineral oil. A couple of pounds were necessary to obtain a homogenous color. Before the end of the batch, the pigment pump was shut down and oil was introduced in the pigment addition tube to purge the pigment from it. During this time the adhesive was still running in such a manner to flush the static mixer. Approximately 30 pounds were required. More specific information is available in the following Table 4. For this product two different trials at two different temperatures of 300° F. and 325° F. were conducted. It showed that temperature has no impact on the mixing.

TABLE 4

| Product | RUN #1 Light Green SBS | RUN #2 Light Green SBS |
| --- | --- | --- |
| Glue density @ process temperature | 0.889 | 0.889 |
| Process Temperature (F) | 300 | 325 |
| Pigment density @ room temperature | 1.0124 | 1.0124 |
| Number of elements | 12 | 12 |
| Glue viscosity @ process temperature (cP) | 3700 | 2000 |
| Glue pump speed (rpm) | 100.0 | 100.0 |
| Glue flow rate (lbs/hrs) | 582.2 | 582.2 |
| Pigment pump speed (rpm) | 50.9 | 50.9 |
| Pigment flow rate (lbs/hrs) | 20.18 | 20.18 |
| Total flow rate (lbs/hrs) | 602 | 602 |
| % of pigment | 3.3% | 3.3% |
| Pigment pressure (psi) | 90 | 90 |
| Glue pressure (psi) | 60 | 40 |
| Velocity (m/s) | 0.1678 | 0.1678 |
| Estimated drop pressure (psi) | 48.5 | 26.2 |

EXAMPLE 5

5) Blue EVA Based Hot Melt Made Using a Static Mixer.

An EVA based hot melt adhesive was produced in a turbine kettle using typical process conditions. The composition was comprised of 8.9% of polybutene oil, 59% of resin, 30% of ethylene/vinyl acetate copolymer and 1% of antioxidant. The product was mixed at 325° F. Once the batch was done, the pigment and adhesive gear pump were calibrated to obtain consistent flow that would give 1.1% pigment level. The static mixer (SMX diameter 1.5 inches and length 18 inches containing 12 elements) was kept at 325° F. Adhesive was allowed to flow through a gear pump to the static mixer. When adhesive was coming out of the static mixer, the pigment gear pump was started. The pigment was added in the form of a dispersion in mineral oil. A couple of pounds were necessary to obtain a homogenous color. Before the end of the batch, the pigment pump was shut down and oil was introduced in the pigment addition tube to purge the pigment from it. During this time the adhesive was still running in such a manner to flush the static mixer. Approximately 30 pounds were required. More specific information is available in the following Table 5.

TABLE 5

| Product | Blue EVA |
| --- | --- |
| Glue density @ process temperature | 0.889 |
| Process Temperature (F) | 325 |
| Pigment density @ room temperature | 1.43 |
| Number of elements | 12 |
| Glue viscosity @ process temperature (cP) | 5100 |
| Glue pump speed (rpm) | 100.5 |
| Glue flow rate (lbs/hrs) | 607.7 |
| Pigment pump speed (rpm) | 12.3 |
| Pigment flow rate (lbs/hrs) | 6.84 |
| Total flow rate (lbs/hrs) | 614.5 |
| % of pigment | 1.11% |
| Pigment pressure (psi) | 110 |
| Glue pressure (psi) | 76 |
| Velocity (m/s) | 0.1712 |
| Estimated drop pressure (psi) | 68.2 |

EXAMPLE 6

6) Blue SBS Block Copolymer Based Hot Melt Made Using a Dynamic Shear Mixer.

An SBS hot melt adhesive was produced in a turbine kettle using typical process conditions. The composition was comprised of 19.3% of white mineral oil, 59.2% of styrenated polyterpene hydrocarbon resin, 19.7% of styrene/butadiene/styrene multi-block copolymer resin and 0.7% of antioxidant. The product was mixed at 325° F. Once the batch was done, the pigment and adhesive gear pump were calibrated to obtain consistent flow that would give 1.1% pigment level. The dynamic shear mixer was preheated. Adhesive was allowed to flow through a gear pump to the dynamic shear mixer. When adhesive was coming out of the dynamic mixer, the pigment gear pump was started. The pigment was added in the form of a dispersion in mineral oil. A couple of pounds were necessary to obtain a homogenous color. More specific information is available in the following Table 6.

TABLE 6

| Product | Blue SBS |
| --- | --- |
| Glue density @ process temperature | 0.906 |
| Process Temperature (F) | 310 |
| Pigment density @ room temperature | 1.47 |
| Glue pump speed (rpm) | 74.2 |
| Glue flow rate (lbs/hrs) | 449.0 |
| Pigment pump speed (rpm) | 8.7 |
| Pigment flow rate (lbs/hrs) | 5.00 |
| Total flow rate (lbs/hrs) | 454.0 |

TABLE 6-continued

| Product | Blue SBS |
|---|---|
| % of pigment | 1.10% |
| Pigment pressure (psi) | 10 |
| Glue pressure (psi) | 5 |

EXAMPLE 7

Color Measurement

The miniScan XI Plus spectrocolorimeter of HunterLab was used to assess and compare the static mixed products color with standard color. This is a versatile color measurement instrument that can be used on products of virtually any size and in industries as diverse as paint and textiles.

The Hunter color scales give measurements of color in units of approximate visual uniformity throughout the color solid. Thus, in the Hunter scale, L measures lightness and varies from 100 for perfect white to zero for black, approximately as the eye would evaluate it. The chromaticity dimensions (a and b) give understandable designations of color as follows:

a measures redness when positive, gray when zero, and greenness when negative b measures yellowness when positive, gray when zero, and blueness when negative Samples were compared to in house standards. The Hunter lab total color difference (ΔE), which represents the average of color difference was used. It is calculated as follows:

$$\Delta E = \sqrt{\Delta L^2 + \Delta a^2 + \Delta b^2}$$

where:

$$\Delta L = L_{SMP} - L_{STD}$$

(if +ΔL, sample is lighter than std;

if −ΔL, sample is darker than std.)

$$\Delta a = a_{SMP} - a_{STD}$$

(if +Δa, sample is redder than std;

if −Δa, sample is greener than std.)

$$\Delta b = b_{SMP} - b_{STD}$$

(if +Δb, sample is more yellow than std;

if −Δb, sample is more blue than std.)

Color difference between different samples of several trials and standard color were measured. The following data were obtained.

TABLE 7

Color Measurement Summary

| Product | Average ΔE | Range ΔE | Std Deviation | Max Deviation (%) |
|---|---|---|---|---|
| Example 1/Run 1 | 2.24 | 2.12–2.32 | 0.06 | 5.3 |
| Example 1/Run 2 | 1.14 | 1.00–1.21 | 0.08 | 12.3 |
| Example 2 | 4.03 | 3.44–4.23 | 0.19 | 14.6 |
| Example 6 | 3.19 | 2.71–3.57 | 0.22 | 15 |
| Example 5 | 2.78 | 2.67–2.89 | 0.09 | 3.9 |

TABLE 7-continued

Color Measurement Summary

| Product | Average ΔE | Range ΔE | Std Deviation | Max Deviation (%) |
|---|---|---|---|---|
| Example 4/Run 1 | 6.49 | 6.34–6.64 | 0.08 | 2.3 |
| Example 4/Run 2 | 6.49 | 6.32–6.65 | 0.10 | 2.6 |

The results in Table 7 show that the consistency of the process is very good because the standard deviation was very low for all lots. ΔE is relatively high in some lots because it is very difficult to make sure that flow rate adjustment is correct.

I claim:

1. A method of post-mixing a pigment or dye with a hot melt adhesive, comprising the steps of:
   providing a source of molten hot melt adhesive;
   providing a first pigment or dye in solution or liquid dispersion for said hot melt adhesive;
   providing a flushing agent compatible with said hot melt adhesive;
   feeding said molten hot melt adhesive from the hot melt adhesive source to a mixer at a flow rate;
   simultaneously feeding the pigment or dye for said hot melt adhesive to said mixer such that the first pigment or dye is introduced downstream of the source of molten hot melt adhesive;
   mixing the first pigment or dye and the molten hot melt adhesive in said mixer to form a homogenous mixture;
   recovering said homogeneous mixture; and
   subsequently flushing said mixer prior to feeding and mixing another pigment or dye in said mixer;
   wherein the step of flushing said mixer comprises preventing the first pigment or dye from being fed to said mixer and feeding the flushing agent to said mixer for a sufficient amount of time to substantially completely purge said mixer of the first pigment or dye.

2. The method of claim 1 wherein said mixer comprises a static mixer.

3. The method of claim 1 wherein said mixer comprises a dynamic mixer.

4. The method of claim 1 further including the step of heating said mixer to maintain said hot melt adhesive in a molten state during said mixing.

5. The method of claim 1 wherein said flushing agent is an oil.

6. The method of claim 1 practiced on a continuous basis.

7. The method of claim 1 practiced on a batch basis.

8. The method as recited in claim 1 wherein:
   said hot melt adhesive is fed to the mixer via a first line to an inlet of the mixer; and
   said pigment or dye is fed to the mixer via a second line to the inlet of the mixer, the second line being separate from the first line.

9. The method as recited in claim 1 wherein the step of flushing further comprises feeding said molten hot melt adhesive from the hot melt adhesive source to the mixer and purging the mixer with a mixture of molten hot melt adhesive and flushing agent.

10. The method as recited in claim 1 wherein said mixer is flushed without flushing the source of molten hot melt adhesive.

* * * * *